(12) United States Patent
Tirunagari et al.

(10) Patent No.: US 8,837,692 B2
(45) Date of Patent: Sep. 16, 2014

(54) SELECTING A VOICE MAILBOX FOR A CALL ASSOCIATED WITH A DIVERSION CHAIN

(75) Inventors: Vamsi Mohan Tirunagari, Secunderabad (IN); Rajasheela T. Sundarabai, Bangalore (IN); Ravikumar R, Coimbatore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/427,332

(22) Filed: Mar. 22, 2012

(65) Prior Publication Data

US 2013/0251123 A1 Sep. 26, 2013

(51) Int. Cl.
*H04M 1/64* (2006.01)
*H04M 3/42* (2006.01)

(52) U.S. Cl.
USPC .................................. 379/88.22; 379/211.01

(58) Field of Classification Search
USPC ....................................................... 379/88.22
See application file for complete search history.

(56) References Cited

U.S. PATENT DOCUMENTS

| | | | |
|---|---|---|---|
| 7,920,692 B2 * | 4/2011 | Olshansky et al. | 379/225 |
| 8,027,335 B2 * | 9/2011 | Ansari et al. | 370/353 |
| 8,081,747 B2 | 12/2011 | Bangor et al. | |
| 8,090,083 B2 | 1/2012 | Fong et al. | |
| 8,094,789 B2 | 1/2012 | Schroeder et al. | |
| 8,112,060 B2 | 2/2012 | Sip | |
| 8,130,919 B2 | 3/2012 | Kalbag | |
| 2007/0092073 A1 * | 4/2007 | Olshansky et al. | 379/232 |
| 2010/0189230 A1 * | 7/2010 | Jackson et al. | 379/88.22 |
| 2011/0299668 A1 * | 12/2011 | Davies et al. | 379/88.12 |
| 2012/0033794 A1 * | 2/2012 | Jackson et al. | 379/93.24 |
| 2013/0065561 A1 * | 3/2013 | Eichen et al. | 455/413 |
| 2013/0251123 A1 * | 9/2013 | Tirunagari et al. | 379/88.22 |

OTHER PUBLICATIONS

Vocalpedia, "Customizing Your Extension," 3 pages, printed Feb. 8, 2012.
Levy et al., "Diversion Indication in SIP Draft-Levy-Sip-Diversion-08," pp. 1-39, printed Feb. 8, 2012.

* cited by examiner

*Primary Examiner* — Joseph T Phan
(74) *Attorney, Agent, or Firm* — Baker Botts L.L.P.

(57) ABSTRACT

A selection identifying a voice mailbox associated with an endpoint in a call diversion chain in which to store a voice message is received. In response to receiving a call from an endpoint and the call not being answered, a header field is generated in signaling data for the call that identifies the selected voice mailbox to store a voice message associated with the call.

12 Claims, 3 Drawing Sheets

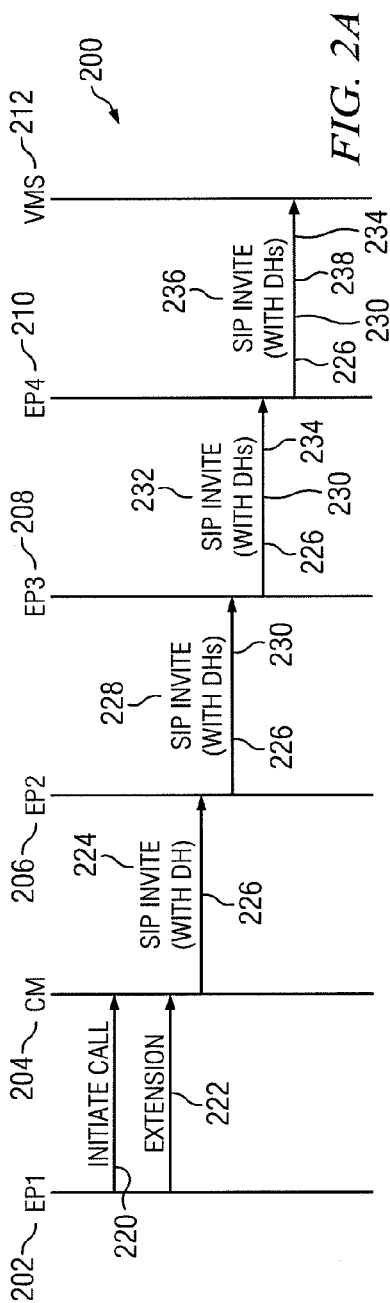

FIG. 2A

DIVERSION HEADERS (CM TO EP2)

DIVERSION: <sip:AA@10.78.83.10>;reason=xyz;privacy=off;screen=yes;mailbox=no ~226

DIVERSION HEADERS (EP2 TO EP3)

DIVERSION: <sip:AA@10.78.83.10>;reason=xyz;privacy=off;screen=yes;mailbox=no ~226
DIVERSION: <sip:EP2@10.78.83.10>;reason=noanswer;privacy=off;screen=yes;mailbox=no ~230

DIVERSION HEADERS (EP3 TO EP4)

DIVERSION: <sip:AA@10.78.83.10>;reason=xyz;privacy=off;screen=yes;mailbox=no ~226
DIVERSION: <sip:EP2@10.78.83.10>;reason=noanswer;privacy=off;screen=yes;mailbox=no ~230
DIVERSION: <sip:EP3@10.78.83.10>;reason=noanswer;privacy=off;screen=yes;mailbox=yes ~234

DIVERSION HEADERS (EP4 TO VMS)

DIVERSION: <sip:AA@10.78.83.10>;reason=xyz;privacy=off;screen=yes;mailbox=no ~226
DIVERSION: <sip:EP2@10.78.83.10>;reason=noanswer;privacy=off;screen=yes;mailbox=no ~230
DIVERSION: <sip:EP3@10.78.83.10>;reason=noanswer;privacy=off;screen=yes;mailbox=yes ~234
DIVERSION: <sip:EP4@10.78.83.10>;reason=noanswer;privacy=off;screen=yes;mailbox=no ~238

FIG. 2B

SELECTING A VOICE MAILBOX FOR A CALL ASSOCIATED WITH A DIVERSION CHAIN

TECHNICAL FIELD

The present disclosure relates generally to selecting a voice mailbox for a call, and more particularly to selecting a voice mailbox in which to store a voice message associated with a call diversion chain.

BACKGROUND

Call forwarding is a call feature that facilitates the diversion of a call from one endpoint to another endpoint. In certain instances, the call may be diverted one or more times through a number of endpoints. The various endpoints that participate in the call forwarding scenario may be part of a diversion chain. Each endpoint in the diversion chain may have an associated voice mailbox.

BRIEF DESCRIPTION OF THE DRAWINGS

To provide a more complete understanding of the present disclosure and the features and advantages thereof, reference is made to the following description taken in conjunction with the accompanying drawings, in which:

FIG. 2A is a call flow diagram that illustrates an example of a call flow for selecting a voice mailbox in which to store a voice message for a call associated with a diversion chain;

FIG. 2B illustrates an example of signaling data that may be used in the call flow of FIG. 2A to select a voice mailbox in which to store a voice message for a call associated with a diversion chain.

DESCRIPTION OF EXAMPLE EMBODIMENTS

Overview

The teachings of the present disclosure relate to receiving a selection identifying a voice mailbox associated with an endpoint in a call diversion chain in which to store a voice message, and in response to receiving a call from an endpoint and the call not being answered, generating a header field in signaling data for the call that identifies the selected voice mailbox to store a voice message associated with the call.

Description

Figure 1:
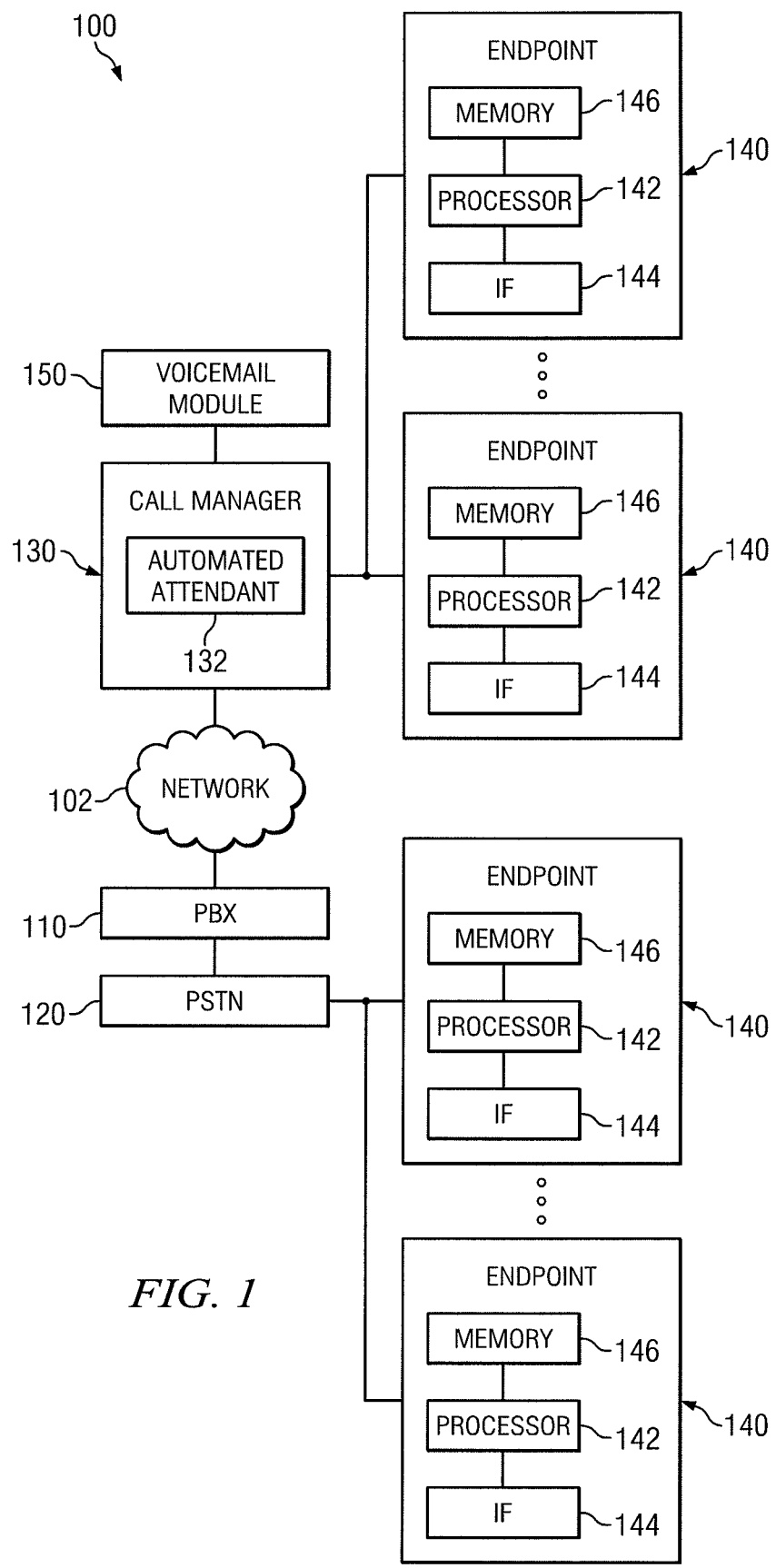
FIG. 1 is a block diagram that illustrates an example of a system for selecting a voice mailbox in which to store a voice message for a call associated with a diversion chain.

FIG. 1 is a block diagram that illustrates an example of a system for selecting a voice mailbox in which to store a voice message for a call associated with a diversion chain. System 100 includes network 102, public branch exchange (PBX) 110, public switched telephone network (PSTN) 120, call manager 130, which may comprise automated attendant (auto-attendant) 132, one or more endpoints 140, and voicemail module 150.

In particular embodiments, a call may be diverted one or more times through a number of different endpoints 140, thereby forming a diversion chain (sometimes known as a forwarding chain). In an embodiment, call diversion may occur in response to information communicated from a caller. For example, auto-attendant 132 may receive a call, receive an extension of another endpoint 140 from the caller, and divert the call to the endpoint 140 identified by the extension. In another embodiment, call diversion may be initiated by a user of an endpoint 140. For example, a user may set up a diversion chain at an endpoint 140 or other suitable interface within system 100 (e.g., an internet portal) before a call or after receiving a call at an endpoint 140. Endpoint 140 may receive a call (e.g., from auto-attendant 132 or another endpoint 140) and divert the call to another endpoint 140 according to the diversion chain. Diversion chains may be selected in any suitable manner and for any suitable purpose.

Endpoints 140 in a diversion chain may indicate, in a mailbox field of signaling data for a call, a voice mailbox in which to store a voice message associated with the call. Endpoints 140 may receive a selection identifying a voice mailbox in which to store a voice message for a call. In an embodiment, endpoint 140 receives, from a user, a selection of a voice mailbox in which to store a voice message for a call. In another embodiment, endpoint 140 receives a selection identifying a voice mailbox in which to store a voice message for a call from another component. For example, a user may utilize an interface other than endpoint 140 to make a selection of a voice mailbox for a call (e.g., a web portal or other suitable interface). Endpoint 140 may receive a selection during a call (e.g., a user pressing a call diversion button on an endpoint 140), or before a call (e.g., a user setting up a call diversion chain).

In an embodiment, an endpoint 140 indicates in a mailbox field of signaling data for the call (e.g., a diversion header) whether or not to store a voice message associated with the call in a voice mailbox associated with the endpoint 140. For example, if an endpoint 140 has received a selection indicating that a voice mailbox associated with the endpoint 140 is the selected voice mailbox for the call, the endpoint 140 indicates in a mailbox field of signaling data for the call that a voice message for the call should be stored in a voice mailbox associated with the endpoint 140.

In an embodiment, if an endpoint 140 has not received a selection notifying the endpoint 140 that a voice mailbox associated with the endpoint 140 is the selected voice mailbox, then the endpoint 140 indicates in a mailbox field of signaling data for the call that a voice message for the call should not be stored in a voice mailbox associated with the endpoint 140.

In another embodiment, an endpoint 140 receives a selection identifying a selected voice mailbox for a call. The selected voice mailbox may be associated with an identifier (e.g., 1003). Endpoint 140 indicates in a mailbox field of signaling data for the call that a voice message for the call should be stored in the voice mailbox associated with "1003."

If the call is not answered by any endpoint 140 in a diversion chain, the call may be sent to voicemail module 150 with the signaling data from one or more endpoints 140. Voicemail module 150 determines from the mailbox field in signaling data where a voice message for the call should be stored.

Network 102 represents any suitable network operable to facilitate communication between components of system 100, such as PBX 110, PSTN 120, call manager 130, endpoints 140, and voicemail module 150. Network 102 may include any interconnecting system capable of transmitting audio, video, electrical signals, optical signals, data, messages, or any combination of the preceding. Network 102 may include all or a portion of a PSTN, a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100.

PBX 110 represents an internal, private telephone routing and switching device that connects incoming voice messages to the appropriate internal endpoint extension and outgoing voice messages to the appropriate external endpoint. PBX 110 operates with PSTN 120 to connect calls with external endpoint 140.

PSTN 120 represents a public switched telephone network. PSTN 120 may comprise fixed line communication systems, wireless communication systems, communication satellites, or any other suitable communication system. In certain embodiments, PSTN 120 links private networks (e.g., PBX 110) to external endpoints 140.

Call manager 130 includes any combination of hardware, software and/or encoded logic that operates to receive and process calls to facilitate communication among components of system 100. In particular embodiments, call manager 130 may act as a PBX by supporting Internet Protocol (IP) PBX functions, such as hold, park, transfer, redirect and/or other high level and low level call management features. In an embodiment, call manager 130 may include an auto-attendant 132. Auto-attendant 132 represents a device that may automatically answer a call, receive data (e.g., telephone extensions) identifying the intended destination of the call, and/or divert the call to the intended destination (e.g., endpoint 140). In certain embodiments, the functionality of call manager 130 may be performed by a proxy server.

Endpoints 140 represent any components operable to communicate and/or receive voice data. Endpoints 140 may comprise any combination of hardware components and/or software or logic encoded in a non-transitory computer readable medium for execution by a processor. Endpoints 140 may be part of a private network and connect to network 102 through call manager 130, or a public network and connect to network 102 through PSTN 120. In particular embodiments, endpoints 140 may include an auto-attendant (e.g., auto-attendant 132), any type of telephone, or other device operable to communicate and/or receive voice data. A telephone may include a global system for mobile (GSM) mobile phone, a code division multiple access (CDMA) mobile phone, wired phone, a public switched telephone network (PSTN) based phone, and an internet protocol (IP) based phone (e.g., fixed, mobile, soft). In certain embodiments, call originating endpoints 140 may be IP based or PSTN based, and receiving and/or forwarding endpoints 140 may only be IP based.

In certain embodiments, an endpoint 140 receives a selection indicating a selected voice mailbox for a call. Endpoints 140 may indicate in a field within signaling data for a call (e.g., a diversion header) a voice mailbox to store a voice message for the call. For example, an endpoint 140 may add and/or populate a mailbox field in signaling data for a call. The mailbox field may be any portion of signaling data that indicates to voicemail module 150 a voice mailbox to store a voice message for a call. For example, the mailbox field may say "mailbox," the mailbox field may be a particular portion of signaling data (e.g., the last 10 bits), or any other grouping of signaling data that may identify a selected voice mailbox to voicemail module 150. In certain embodiments, a mailbox field may be added to signaling data for a call if the call contains a redirection trigger such as: "call forward all," "call forward busy," "call forward no answer/unconditional," "call forward unregistered," "call forward unavailable," "immediate divert/enhanced immediate divert," or any other suitable redirection trigger or any combination of suitable redirection triggers.

In an embodiment, an endpoint 140 may indicate in the mailbox field whether a voice message for the call should be stored in a voice mailbox associated with endpoint 140. For example, each endpoint 140 in a diversion chain may add and/or populate, the mailbox field with "yes" to indicate that a voice message for the call should be stored in a voicemail box associated with that endpoint 140, or may add and/or populate the mailbox field with "no" to indicate that a voice message for the call should not be stored in a voicemail box associated with that endpoint 140. Endpoints 140 may use any type of suitable data to indicate yes or no (e.g., populating the mailbox field with "0" may indicate no, and populating the mailbox field with "1" indicates yes). In certain embodiments, only one endpoint 140 will indicate "yes" in the mailbox field.

In another embodiment, an endpoint 140 may indicate in the mailbox field that a voice message for the call should be stored in a voice mailbox associated with a specific endpoint 140. For example, an endpoint 140 may be associated with an identifier, such as "1003." An endpoint 140 may generate and/or populate the mailbox field with "1003" to indicate that a voice message for the call should be stored in a voice mailbox associated with the endpoint 140 identified by "1003." Endpoints 140 may use any type of suitable data to identify a specific endpoint 140.

In certain embodiments, each endpoint 140 in a diversion chain maintains the signaling data from previous endpoints 140 in the diversion chain, thereby maintaining a complete diversion history for the call. In other embodiments, endpoints 140 in a diversion chain may only maintain signaling data from some, or none, of the previous endpoints 140 in the diversion chain. For example, endpoints 140 may only maintain signaling data from an endpoint 140 that indicates that a voice mailbox associated with that endpoint 140 is the selected voice mailbox for a voice message for the call, or an endpoint 140 that indicates that a voice mailbox associated with a particular endpoint 140 is the selected voice mailbox for a voice message for the call.

Voicemail module 150 represents a module that manages the storage of a voice message associated with a call. In certain embodiments, voicemail module 150 receives signaling data (e.g., a diversion header) from endpoints 140 involved in a call, and voicemail module 150 determines from the signaling data a voice mailbox in which to store a voice message associated with the call. Voicemail module 150 may be associated with an enterprise, a call diversion chain, or other grouping of endpoints 140. In certain embodiments, voicemail module 150 is associated with a particular network. For example, voicemail module 150 may be associated with a private network (e.g., an enterprise network), a public network, a remote network, an internal network, a wireless network, or any other suitable grouping of endpoints 140. In certain embodiments, voicemail module 150 includes one or more voicemail servers.

In an embodiment of operation, auto-attendant 132 of call manager 130 receives a call from a first endpoint 140. Auto-attendant 132 may receive an extension from the first endpoint 140 requesting that the call be redirected to a second endpoint 140. In an embodiment, auto-attendant 132 identifies in signaling data for the call that a voice message for the call should not be stored in a voice mailbox associated with auto-attendant 132, and redirects the call to the second endpoint 140.

If second endpoint 140 receives the call and no one answers the call, the call is redirected to a third endpoint 140. Second endpoint 140 may redirect the call because the call was not answered before a diversion trigger automatically initiated a call diversion (e.g., a particular number of rings, an input from a user, or any other suitable trigger). For example, second endpoint 140 receives a call containing a diversion trigger, and redirects the call to a third endpoint 140 by framing a SIP INVITE message with a diversion header containing a populated mailbox field indicating a selected voice mailbox to store a voice message associated with the call.

In exemplary embodiment, second endpoint 140 receives a selection identifying a voice mailbox associated with second endpoint 140 as a selected voice mailbox for a call. Second endpoint 140 may indicate in signaling data for the call that a voice message for the call should be stored in a voice mailbox associated with the second endpoint 140, and redirect the call to a third endpoint 140.

If third endpoint 140 receives the call and no one answers the call, the call is redirected. Third endpoint 140 may indicate in signaling data for the call that a voice message for the call should not be stored in a voice mailbox associated with the third endpoint 140, and may redirect the call to voicemail module 150.

Voicemail module 150 receives the call and determines from the signaling data for the call where to store a voice messages associated with the call. For example, voicemail module 150 stores a voice message for the call in a voice mailbox associated with the second endpoint 140 because voicemail module 150 determines that the second endpoint 140 identified in signaling data for the call that a voice message for the call should be stored in a voice mailbox associated with the second endpoint 140.

In certain embodiments, endpoints 140 receive voice mailbox selections, and add and/or populate call signaling, data with a mailbox field that identifies where to store a voice message for a call. In certain embodiments, other system 100 components (e.g., call manager 130) may receive voice mailbox selections and add and/or populate a mailbox field of signaling data for a call, for example, because one or more endpoints 140 may not be operable to receive voice mailbox selections, or to add and/or populate a mailbox field of signaling data for a call (e.g., "dumb" endpoints 140). For example, call manager 130 frames a SIP INVITE message with a diversion header containing a populated mailbox field identifying a selected voice mailbox for the call for a "dumb" endpoint 140.

In an exemplary embodiment, call manager 130 receives a call for a "dumb" endpoint 140 and call manager 130 checks signaling data for the call for a redirection trigger. If a redirection trigger is identified, call manager 130 frames a SIP INVITE message with a diversion header with a populated mailbox field and sends it to the next endpoint 140 in the call forwarding chain for the "dumb" endpoint 140. In an embodiment, if the redirection trigger is a "call forward no answer," call manager 130 frames and sends a SIP INVITE message to the "dumb" endpoint 140. If the "dumb" endpoint 140 does not answer, call manager 130 releases the call to the "dumb" endpoint 140 and generates a SIP INVITE with a diversion header with a populated mailbox field and sends it to the next endpoint 140 in the call forwarding chain.

A first endpoint 140 receives a call containing a diversion trigger and sends a 3xx response with a diversion header containing a populated mailbox field to call manager 130. Call manager 130 redirects the call to the next endpoint 140 by framing a new SIP INVITE message based on the contact header of the 3xx response and adds a diversion header with the populated mailbox field from the 3xx response.

An endpoint 140 receives the SIP INVITE message, but may already be engaged in another call. Endpoint 140 sends a "486 Busy Here" response to call manager 130. In this example, call manager 130 frames a SIP INVITE message with a diversion header with a populated mailbox field and sends it to the next endpoint 140 in the diversion chain.

Modifications, additions, or omissions may be made to system 100. System 100 may include more, fewer, or other components. Signaling data may be any one or more of a plurality of signaling protocols (e.g., SIP). Endpoints 140 may receive a voice mailbox selection from a user. For example, a user may select a voice mailbox using an endpoint 140, a web portal linked to system 100, or other suitable interface to system 100. Additionally, any functions described as being performed by endpoints 140 may be performed by other components, e.g., call manager 130.

Any suitable component of system 100 may include a processor, interface, logic, memory, and/or other suitable element (e.g., call manager 130, endpoints 140, and voicemail module 150). A processor represents any computing device, such as processors 142, configured to control the operation of one or more components of system 100. A processor may comprise one or more processors and may be a programmable logic device, a microcontroller, a microprocessor, any suitable processing device, or any suitable combination of the preceding. A processor includes any hardware and/or software that operates to control and process information received by a component of system 100. In certain embodiments, a processor communicatively couples to other components of system 100, such as an interface (e.g., interface 144), a memory (e.g., memories 146), or any other suitable component.

An interface represents any component, such as interface 144, operable to receive input, send output, process the input and/or output, and/or perform other suitable operations for a component of system 100. An interface includes any port or connection, real or virtual, including any suitable hardware and/or software, including protocol conversion and data processing capabilities, to communicate through network 102. In certain embodiments, an interface includes a user interface (e.g., physical input, graphical user interface, touchscreen, buttons, switches, transducer, or any other suitable method to receive input from a user).

A memory represents any component, such as memory 146, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases.

Logic may perform the operation of any component of system 100, for example, logic executes instructions to generate output from input. Logic may include hardware, software, and/or other logic. Logic may be encoded in one or more non-transitory, tangible media, such as a computer-readable medium or any other suitable tangible medium, and may perform operations when executed by a computer and/or processor. Certain logic, such as a processor, may manage the operation of a component.

FIG. 2A is a call flow diagram that illustrates an example of a call flow 200 for selecting a voice mailbox in which to store a voice message for a call associated with a diversion chain.

In the illustrated embodiment, Endpoint-1 202 initiates call 220 that is received at call manager 204. Call manager 204 may include an auto-attendant that automatically diverts calls to other endpoints 140, for example, in response to receiving extension of an endpoint 140. In the illustrated embodiment, endpoint-1 202 communicates extension 222 to the auto-attendant of call manager 204. Call manager 204 determines that extension 222 identifies endpoint-2 206. Call manager 204 diverts call 220 to endpoint-2 206 by communicating SIP INVITE 224 to endpoint-2 206, and includes diversion header 226 from call manager 204 in SIP INVITE 224. In the illustrated embodiment, diversion header 226 includes a mailbox field that identifies whether a voice message associated with call 220 should be stored in a voice mailbox associated with call manager 204. The mailbox field in diversion header 226 contains a "no" value, which indicates that voicemail server 212 should not store a voice message associated with the call with call manager 204. For example, the mailbox field may contain a "no" value if call manager 204 does not have a voice mailbox associated with it.

Endpoint-2 206 receives call 220 and diversion header 226 via SIP INVITE 224. In the illustrated embodiment, call 220 is not answered at endpoint-2 206, and endpoint-2 206 determines that the call should be diverted to endpoint-3 208. Endpoint-2 206 diverts call 220 to endpoint-3 208 by communicating SIP INVITE 228, which includes diversion header 230 from endpoint-2 206 and diversion header 226 from call manager 204.

In the illustrated embodiment, the mailbox field in diversion header 230 contains a "no" value, indicating that a voice message for call 220 should not be left with a voice mailbox associated with endpoint-2 206.

Endpoint-3 208 receives call 220 and diversion headers 226 and 230 via SIP INVITE 228. In the illustrated embodiment, call 220 is not answered at endpoint-3 208, and endpoint-3 208 determines that the call should be diverted to endpoint-4 210. Endpoint-3 208 diverts call 220 to endpoint-4 210 by communicating SIP INVITE 232, which includes diversion header 234 from endpoint-3 208, diversion header 226 from call manager 204, and diversion header 230 from endpoint-2 206.

In the illustrated embodiment, the mailbox field in diversion header 234 contains a "yes" value, indicating that a voice message for call 220 should be left with a voice mailbox associated with endpoint-3 208. In an embodiment, endpoint-3 208 received a selection identifying a voice mailbox associated with endpoint-3 208 as the selected voice mailbox for call 220.

Endpoint-4 210 receives call 220 and diversion headers 226, 230, and 234 via SIP INVITE 232. In the illustrated embodiment, call 220 is not answered at endpoint-4 210, and endpoint-4 210 determines that the call should be diverted to voicemail server 212. Endpoint-4 210 sends call 220 to voicemail server 212 by communicating SIP INVITE 236, which includes diversion header 238 from endpoint-4 210, diversion header 226 from call manager 204, diversion header 230 from endpoint-2 206, and diversion header 234 from endpoint-3 208.

In the illustrated embodiment, the mailbox field in diversion header 238 contains a "no" value, indicating that a voice message for call 220 should not be left with a voice mailbox associated with endpoint-4 210.

Voicemail server 212 receives call 220 and diversion headers 226, 230, 234, and 238 via SIP INVITE 236. The mailbox field of diversion headers 226, 230, and 238 contain "no" values, while the mailbox field of diversion header 234 contains a "yes" value. Voicemail server 212 determines from the mailbox field of diversion headers 226, 230, 234, and 238 that a voice message for call 220 should be stored in the voice mailbox associated with endpoint-3 208. Voicemail server 212 directs call 220 to a voicemail box associated with endpoint-3 208.

Modifications, additions, or omissions may be made to call flow 200. Call flow 200 may include more, fewer, or other messages. Call flow 200 may be in any suitable protocol. Call flow 200 may or may not maintain signaling data from all endpoints 140 in a diversion chain. Call flow 200 may include any number of endpoints 140. Call flow 200 may or may not include an auto-attendant 132. Additionally, the diversion headers may be in any suitable format. The mailbox field may be included in signaling data other than a diversion header. In other embodiments, the mailbox field may be any suitable grouping of signaling data from which voicemail server 212 can determine a voice mailbox identified by an endpoint 140 in which to store a voice message for the call.

FIG. 2B illustrates an example of signaling data that may be used in call flow 200 of FIG. 2A to select a voice mailbox in which to store a voice message for a call associated with a diversion chain.

In the illustrated embodiment, signaling data used in call flow 200 includes SIP diversion headers 226, 230, 234, and 238. SIP diversion headers 226, 230, 234, and 238 may include a mailbox field. In an embodiment, the mailbox field is present in the diversion headers, and endpoints 140 involved in a call populate the mailbox field with data. In another embodiment, endpoints 140 generate the mailbox field and populate it with data.

In an embodiment, the mailbox field indicates whether a voice message for the call should be stored in a voice mailbox associated with the endpoint 140 that generated and/or populated the header. For example, if endpoint 140 populates the mailbox field with "yes," then a voice message for the call should be stored in a voice mailbox associated with endpoint 140, but if endpoint 140 populates the mailbox field with "no," then a voice message for the call should not be stored in a voice mailbox associated with endpoint 140.

In another embodiment, the mailbox field indicates a particular endpoint 140 and/or voice mailbox in which to store a voice message for the call. For example, a voice mailbox may be identified by the value "1004," and a mailbox field value of "1004" would indicate that a voice message for the call should be stored in a voice mailbox identified by "1004."

SIP diversion headers 226, 230, 234, and 238 may be communicated with SIP INVITE messages 224, 228, 232, and 236. In an embodiment, each endpoint 140 in a diversion chain maintains the diversion headers from previous endpoints 140 in the diversion chain. For example, SIP INVITE 224 communicated from call manager 204 to endpoint-2 206 contains diversion header 226 from call manager 204. When endpoint-2 206 diverts the call to endpoint-3 208, SIP INVITE 228 includes diversion header 226 from call manager 204 and diversion header 230 from endpoint-2 206. When endpoint-3 208 diverts the call to endpoint-4 210, SIP INVITE 232 includes diversion header 226 from call manager 204, diversion header 230 from endpoint-2 206, and diversion header 234 from endpoint-3 208. When endpoint-4 210 diverts the call to the voice mail system 212, SIP INVITE 236 includes diversion header 226 from call manager 204, diversion header 230 from endpoint-2 206, diversion header 234 from endpoint-3 208, and diversion header 238 from endpoint-4 210.

In the illustrated embodiment, a call to auto-attendant 132 is diverted to endpoint-2 206, then diverted to endpoint-3 208, then diverted to endpoint-4 210, and then diverted to voicemail server 212. In another embodiment, call flow 200 does not include auto-attendant 132, and endpoint 140 receives a call and diverts the call along a diversion chain of one or more endpoints 140 before the diversion chain ends at voicemail server 212. In another embodiment, call flow 200 may include auto-attendant 132 and auto-attendant 132 diverts a call along a diversion chain of one or more endpoints 140 before the diversion chain ends at voicemail server 212.

Figure 3:
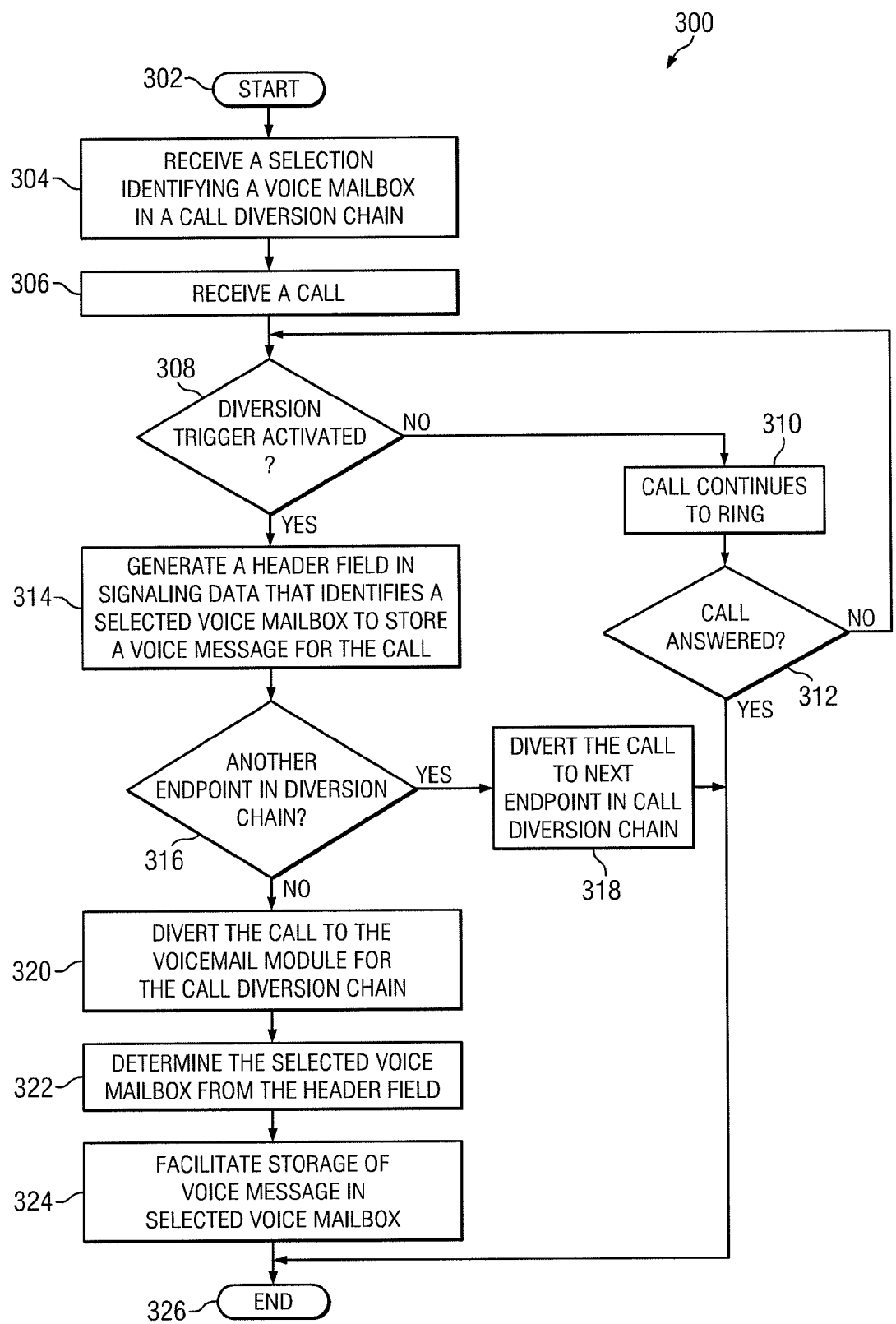
FIG. 3 is a flow chart that illustrates an example method for selecting a voice mailbox in which to store a voice message for a call associated with a diversion chain.

FIG. 3 is a flow chart that illustrates an example method for selecting a voice mailbox in which to store a voice message for a call associated with a diversion chain. Method 300 begins at step 302. At step 304, endpoint 140 receives a selection identifying a voice mailbox in a call diversion chain (e.g., from a user). At step 306, endpoint 140 receives a call. At step 308, endpoint 140 determines whether a diversion trigger has been activated. For example, a diversion trigger may be a number a rings, a specific time, or other suitable trigger to indicate that the call should be diverted. If the diversion trigger has not been activated, the method continues from step 310 and the call continues to ring at endpoint 140. At step 312, endpoint 140 determines whether the call is answered. If endpoint 140 determines that the call is answered, the method continues from step 326 and subsequently ends. If endpoint 140 determines that the call is not answered, the method continues from 308 to determine whether a diversion trigger has activated. If a diversion header has been activated, the method continues from step 314 and endpoint 140 indicates a selected voice mailbox for the call in a header field of signaling data for the call.

At step 316, endpoint 140 determines whether to divert the call to a next endpoint 140. If endpoint 140 determines the call should be diverted to a next endpoint 140, the method continues from step 318 and endpoint 140 diverts the call to a next endpoint 140 and the method ends at step 326. If endpoint 140 determines the call should not be diverted to a next endpoint 140, the method continues from step 320 and endpoint 140 sends the call to voicemail module 150. At step 322, voicemail module 150 determines the selected voice mailbox from the header field of signaling data for the call, and the method continues from step 324. At step 324, voicemail module 150 facilitates storage of a voice message for the call in the selected voice mailbox and the method continues from step 326. At step 326 the method ends.

Modifications, additions, or omissions may be made to method 300. Method 300 may include more, fewer, or other steps. The steps of method 300 my be performed in any suitable order, and may be performed by any suitable component of system 100.

Certain embodiments of the present disclosure may provide one or more technical advantages. In an embodiment, system 100 allows endpoints 140 within a diversion chain to select a voice mailbox to store a voice message for a call. In another embodiment, system 100 allows endpoints 140 to maintain a complete diversion history of a call while identifying a voice mailbox to store a voice message for a call. In still yet another embodiment, system 100 allows for an endpoint 140 receiving a call routed through an auto-attendant 132 to direct voicemail module 150 to store a voice message for the call in a voice mailbox associated with the endpoint 140, and not the auto-attendant 132.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method, comprising:
receiving a selection identifying a voice mailbox associated with an endpoint in a call diversion chain comprising a plurality of endpoints in which to store a voice message; and
in response to receiving a call at an endpoint in the call diversion chain and the call not being answered, generating a SIP diversion header field in signaling data for the call that identifies whether a voice mailbox associated with the endpoint receiving the call is the selected voice mailbox to store a voice message associated with the call, wherein each of the plurality of endpoints in the call diversion chain indicates in the SIP diversion header field for the signaling data for the call whether each voice mailbox associated with each of the plurality of endpoints in the call diversion chain is the selected voice mailbox and each of the plurality of endpoints in the call diversion chain maintains the SIP diversion header field from previous endpoints in the call diversion chain in the signaling data.

2. The method of claim 1, wherein the header field in the signaling data identifies the selected voice mailbox to a voicemail server associated with the call diversion chain.

3. The method of claim 1, wherein an automated attendant receives the call.

4. The method of claim 1, wherein the voice mailbox selection is received from a user of an endpoint in the call diversion chain.

5. A non-transitory computer readable medium comprising logic, the logic, when executed by a processor, operable to:
receive a selection identifying a voice mailbox associated with an endpoint in a call diversion chain comprising a plurality of endpoints in which to store a voice message; and
in response to receiving a call at an endpoint in the call diversion chain and the call not being answered, generate a SIP diversion header field in signaling data for the call that identifies whether a voice mailbox associated with the endpoint receiving the call is the selected voice mailbox to store a voice message associated with the call, wherein each of the plurality of endpoints in the call diversion chain indicates in the SIP diversion header field for the signaling data for the call whether each voice mailbox associated with each of the plurality of endpoints in the call diversion chain is the selected voice mailbox and each of the plurality of endpoints in the call diversion chain maintains the SIP diversion header field from previous endpoints in the call diversion chain in the signaling data.

6. The computer readable medium of claim 5, wherein the header field in the signaling data identifies the selected voice mailbox to a voicemail server associated with the call diversion chain.

7. The computer readable medium of claim 5, wherein an automated attendant receives the call.

8. The computer readable medium of claim 5, wherein the voice mailbox selection is received from a user of an endpoint in the call diversion chain.

9. An apparatus, comprising:
an interface operable to receive a selection identifying a voice mailbox associated with an endpoint in a call diversion chain comprising a plurality of endpoints in which to store a voice message; and
a processor communicatively coupled to the interface and the processor operable to, in response to receiving a call at an endpoint in the call diversion chain and the call not being answered, generating a SIP diversion header field in signaling data for the call that identifies whether a voice mailbox associated with the endpoint receiving the call is the selected voice mailbox to store a voice message associated with the call, wherein each of the plurality of endpoints in the call diversion chain indicates in the SIP diversion header field for the signaling data for the call whether each voice mailbox associated with each of the plurality of endpoints in the call diversion chain is the selected voice mailbox and each of the plurality of endpoints in the call diversion chain maintains the SIP diversion header field from previous endpoints in the call diversion chain in the signaling data.

10. The apparatus of claim 9, wherein the header field in the signaling data identifies the selected voice mailbox to a voicemail server associated with the call diversion chain.

11. The apparatus of claim 9, wherein an automated attendant receives the call.

12. The apparatus of claim 9, wherein the voice mailbox selection is received from a user of an endpoint in the call diversion chain.

* * * * *